US009220130B1

(12) United States Patent
Smith

(10) Patent No.: US 9,220,130 B1
(45) Date of Patent: Dec. 22, 2015

(54) METHOD AND APPARATUS FOR CONTROLLING OPERATION OF RANGE TOP HEATING ELEMENTS FOR COOKING

(71) Applicant: Todd A. Smith, Cleveland, TN (US)

(72) Inventor: Todd A. Smith, Cleveland, TN (US)

(73) Assignee: Brown Stove Works, Inc., Cleveland, TN (US)

( * ) Notice: Subject to any disclaimer, the term of this patent is extended or adjusted under 35 U.S.C. 154(b) by 222 days.

(21) Appl. No.: 13/940,694

(22) Filed: Jul. 12, 2013

(51) Int. Cl.
*H05B 1/02* (2006.01)
*A47J 27/62* (2006.01)

(52) U.S. Cl.
CPC ............... *H05B 1/0266* (2013.01); *A47J 27/62* (2013.01)

(58) Field of Classification Search
CPC ..... A47J 27/62; H05B 1/0266; H05B 1/0263; H05B 1/0213; H05B 1/02; H05B 3/0076; H05B 2213/04
USPC ................. 219/481, 485, 507, 446.1, 448.11, 219/448.17, 448.18
See application file for complete search history.

(56) References Cited

U.S. PATENT DOCUMENTS

| | | | | | |
|---|---|---|---|---|---|
| 6,133,552 | A * | 10/2000 | Saulnier et al. | ............ | 219/446.1 |
| 6,246,033 | B1 * | 6/2001 | Shah | .......................... | 219/447.1 |
| 6,693,262 | B2 * | 2/2004 | Gerola et al. | .............. | 219/462.1 |
| 7,268,324 | B2 * | 9/2007 | Liebold et al. | ................ | 219/506 |
| 8,274,020 | B2 * | 9/2012 | Donarski et al. | .............. | 219/486 |
| 8,723,085 | B2 * | 5/2014 | Callahan et al. | .............. | 219/494 |
| 2004/0099652 | A1 * | 5/2004 | Berkcan et al. | .......... | 219/448.11 |
| 2005/0274710 | A1 * | 12/2005 | Toyos et al. | .............. | 219/448.11 |

* cited by examiner

*Primary Examiner* — Mark Paschall
(74) *Attorney, Agent, or Firm* — Stephen J. Stark

(57) ABSTRACT

A range has burner elements which are connected in series with a temperature switch. Upon reaching a predetermined temperatures, the switch opens and power to the burner element is secured. The burner elements are preferably open coil units, but radiant burner elements may employ similar technology with a lower upper threshold than prior art units have used. Lowering the temperature in a cooking utensil below common ignition temperatures while still allowing boiling is an objective of many embodiments.

17 Claims, 3 Drawing Sheets

METHOD AND APPARATUS FOR CONTROLLING OPERATION OF RANGE TOP HEATING ELEMENTS FOR COOKING

FIELD OF THE INVENTION

The present invention relates to a method and devices for controlling the temperature of kitchen utensils on a burner element such as a surface burner element in an electric range.

BACKGROUND OF THE INVENTION

Many differing types of electric top surface cooking technologies are currently in existence. One of the most familiar means of top surface cooking is the use of exposed electrical coil elements. An electrical resistance core is typically embedded within an alloy sheath and wound in the shape of concentric circles. Typical shapes are available with three turns (6" diameter/1250 Watts) or four turns (8" diameter/2100 Watts). These types of elements are usually controlled by strictly mechanical means within a type of rotary electric switch. This type of cooking technology is very concise, economical and well accepted in the industry.

Of recent years, newer top cooking technologies have been developed to use alternate methods for controls and heating. Such methods include radiant elements or induction heating under Ceran® glass. These technologies often include more electronic software based means of controls. While software based controls offer a wide array programmed operating options and safety-minded subroutines, it often produces substantial increases in cost to the final marketable product. These designs are also well accepted in the marketplace.

Cooking appliance standards classify top cooking sections as “attended cooking” features. This means that the user should be present to visually observe the heat source and the progress of the food being prepared. Typically, gas burner flames can be observed, or electrical indicators illuminate to show an active electrical element. The food dish may also require periodic attention such as stirring or draining.

Attended top cooking also implies that the user makes manual control adjustments to regulate cooking heat as needed. This may include turning down the heat setting once a boil has been established.

Many cooking accidents have been attributable to the user of a cooking appliance leaving the appliance unattended while performing what should have been attended top cooking. While the user is not present to make heat setting adjustments, pots of water may boil over or boil dry, or cooking oils may overheat and ignite thereby creating a fire which can be extremely problematic inside one’s residence and/or business. There is still no absolute replacement for conscientious cooking practices.

U.S. Pat. No. 6,246,033 provides a method and apparatus for controlling operation of a range top heating element. After ten years of use in the market, this device still has not received wide-spread acceptance. Specifically, when installed on test ranges the applicant, the device has consistently prevented water from boiling. Accordingly, an improved system which still allows water to boil is believed to be desirable.

SUMMARY OF THE INVENTION

It is an object of many embodiments of the present invention to provide at least one of a device and method for limiting the temperature of potentially combustible material in cooking articles on the electric exposed eye(s) of a range for other cooking utensils cooking device.

It is another object of many embodiments of the present invention to provide an improved device and method for remotely sensing temperatures at a location spaced from the burner element so as not to sense conducted heat, but instead radiant heat from the traditional element construction so that traditional burner elements can easily be installed and/or replaced.

It is another object of many embodiments of the present invention to provide an improved apparatus and method for sensing a coil burner element to intrude at or below the level of coils.

It is another object of at least some embodiments to provide radiant burner elements which have at least one of temperature sensor and/or switch which prevents the burner from exceeding a temperature at the glass of over about 720 degrees Farenheit.

Accordingly, in accordance with a presently preferred embodiment of the present invention, an improved method and apparatus for controlling operation or installation of electric coil heating elements is provided. Specifically, a temperature sensing device is preferably located at or below a coil and/or drip pan to sense temperature relative to a cooking utensil or article such as a pan, pot, skillet, etc., to attempt to keep the temperature of the cooking utensil and material therein below an ignition temperature of material commonly cooked on ranges.

Many embodiments do not connect directly to the coil burner elements Those embodiments allow the burner coil element to be easily replaced with standard burner elements that are available in the marketplace. Other more sophisticated burner elements may incorporate temperature switches while still being easily replaceable whereas the prior art shown and described in U.S. Pat. No. 6,246,033 must be removed to replace a burner element.

Accordingly, a temperature circuit interruption switch can be provided preferably together with the coil burner elements in an effort to reduce temperatures-below a targeted threshold in the cooking appliance placed thereon at an upper limit and then restore electricity when temperature is below a lower limit. While not guaranteeing the elimination of cooking fires, the statistical likelihood of such a fire can be dramatically reduced.

Specifically, for at least some embodiments the temperature switch can be mounted at or below the bore of a drip pan or even above the bore the hole in the drip pan so for many embodiments the temperature switch is not physically connected to the burner element. Other embodiments may physically connect the temperature switch to a burner element or at least its wiring and if done so, preferably done as a part of the burner element. The wiring for the temperature switch can be part of the unit so that as the burner element is removed from a socket the temperature switch is removed with the element without a need to separately disassemble portions of the temperature sensing circuit.

While some Ceran® glass style rating elements have temperature control circuits to protect the glass surface above them from shattering in the event of spilling water, at a temperature above 800 degrees Farenheit, the applicant knows of no circuit for reducing the likelihood of ignition of material in a cooking utensil. Accordingly, whereas the prior art current circuits provide for limiting the temperature from exceeding a figure over 800 degrees Farenheit, the applicant’s design for some embodiments prevents the temperature from exceeding something at or below 720 degrees Farenheit to prevent reaching the ignition temperature of some traditional ignition sources such as lard, butter, grease, etc., which ignite slightly above 700 degrees Fahrenheit but below the 800 degrees Farenheit where glass protection temperatures are provided. Temperatures less than, if not significantly less than 700 degrees Farenheit in the burner may be required for some embodiments.

In the coil style ranges, the temperature switch may be supported by a housing, such as one below the drip tray. The temperature switch may be sealed to the housing to prevent moisture from seeping onto an electrical contact or multiple contacts in an undesired manner. Furthermore, the temperature switch is preferably wired for many embodiments in series without a need for a separate processor. However, other embodiments may include a processor which may include a switch connected to a temperature sensor for more sophisticated embodiments.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWINGS

Figure 1:
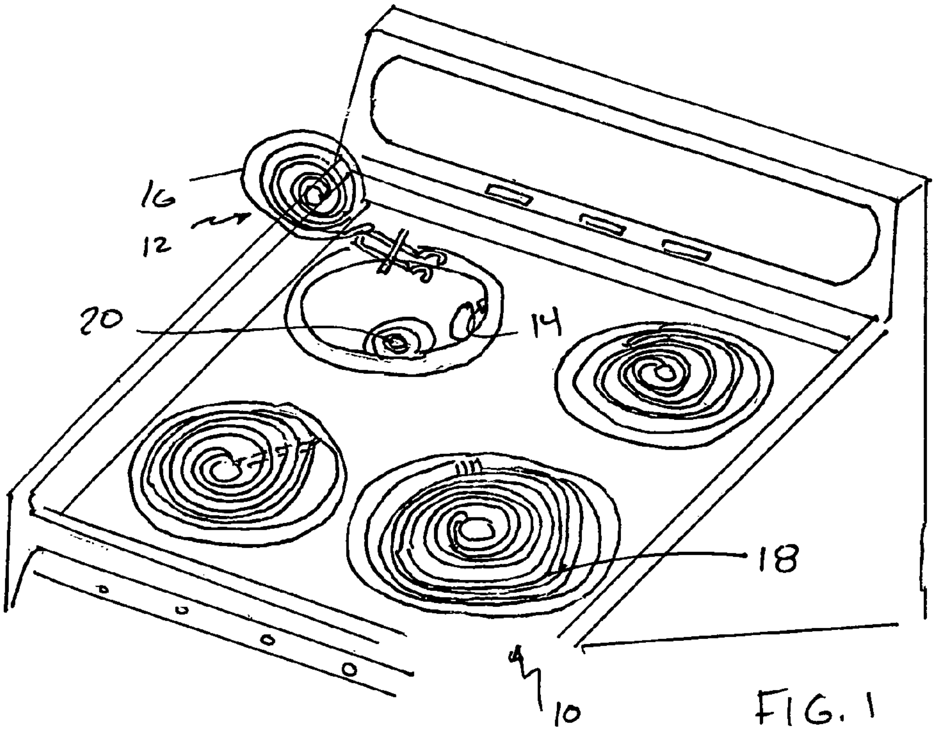
FIG. 1 is a top perspective view of the presently preferred embodiment of the present invention.

FIG. 1 shows a presently preferred embodiment of the present invention in the form of an electric range 10 having burner elements 12 shown as a part of the range 10 which is normally a removable heating element. Each one of the heating element(s) 12 is normally connected into a respective socket 14 so that the element 12 can be removed for cleaning and/or repair and/or replacement over time of the life of the range 10.

Although a standing range 10 is shown, slide in, or drop in or any other cooking range 10 having heated electric exposed eyes as heating element(s) 12 are contemplated particularly those having coils 16 as are known in the art for many embodiments. In the illustrated embodiment, heating element 12 has a series of three coils which is a typical 6" construction. Heating element 18 has four coils which is a typical 8" construction. Other constructions are also likely available in the marketplace.

What distinguishes the applicant's range 10 from prior art ranges is the operation and/or existence of temperature switch 20 which is shown relative to each of the elements 12,18 etc. Temperature switch 20 provides an ability to interrupt current flow through the socket 14 and/or into the heating elements 12 and/or 18 so that should the temperature exceed a predetermined upper limit or threshold at the temperature switch 20, then the electrical power to and/or through the heating element can be secured so that further heating cannot occur particularly so that flammable items which may possibly be a kitchen utensil on top of the element 12,18 are not as likely to be ignited or are significantly less likely to ignite than without such protection.

Figure 2:
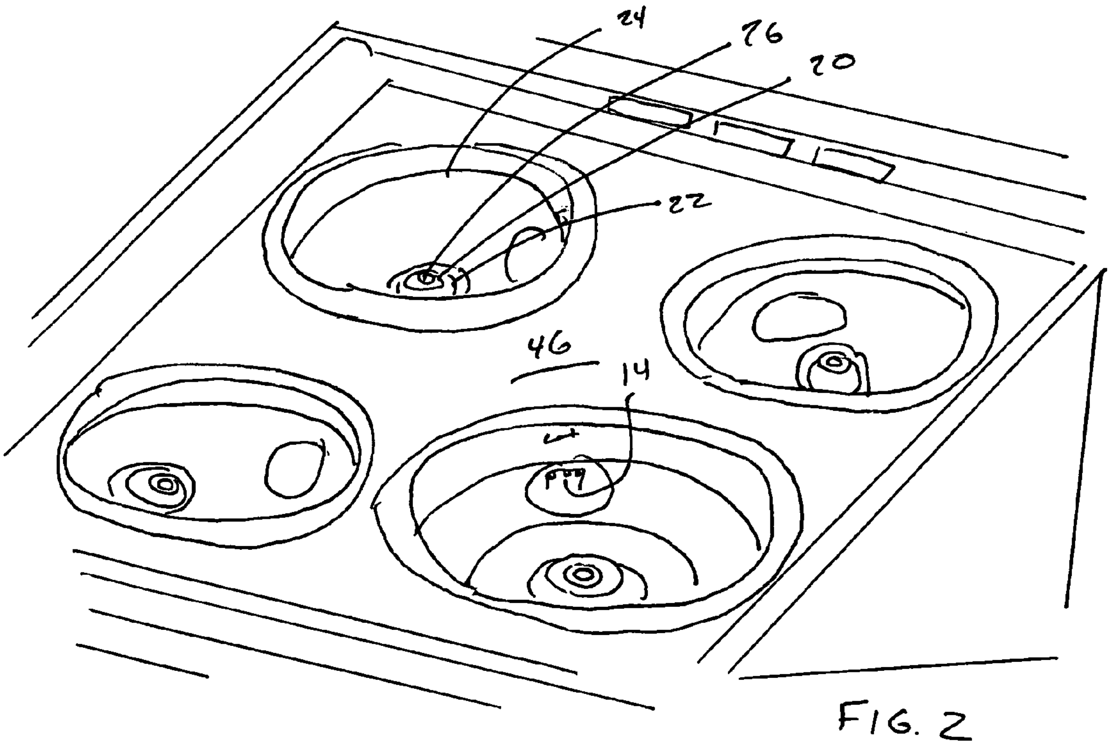
FIG. 2 is a top perspective view of the heating elements removed relative to the drip bowls.
Figure 3:
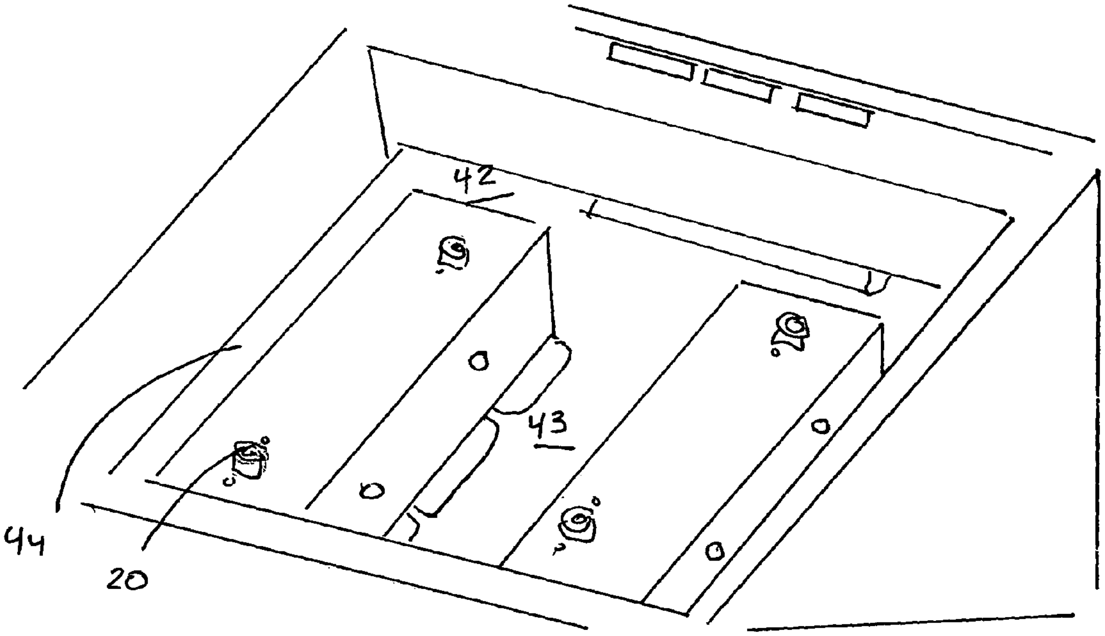
FIG. 3 is a top perspective view of the invention shown in FIG. 1 and FIG. 2 with the range top removed which supports the heating elements and drip bowls.
Figure 5:
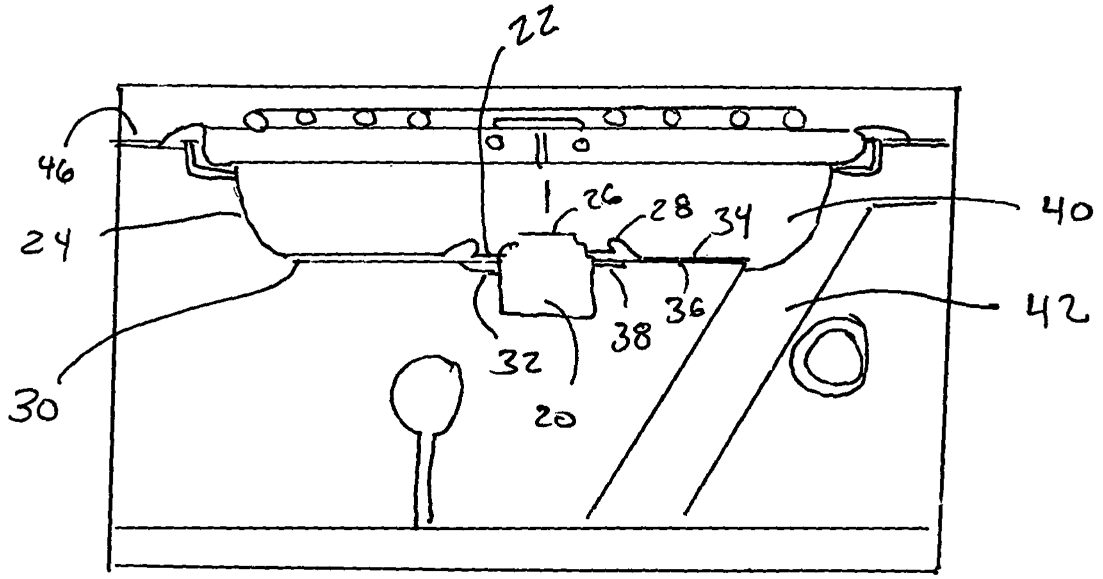
FIG. 5 is a cross-sectional view taken along a heating element shown in FIG. 1.

FIG. 2 shows the temperature switch 20 extending through a bore 22 in drip pan 24 which is one effective way of locating the switch 20. The temperature switch 20 may have an upper surface 26 that extends an elevation above an upper surface 28 of bore 22 such as is shown in FIG. 5. The drip bowl 24 is shown having a lower surface 30 which is preferably slightly above or possibly even contacted an upper surface of housing 32 as will be explained in detail below.

Between an upper surface 34 or lower surface 36 of housing 32 and the switch 20 is preferably a sealing gasket 38 which may prevent fluid from passing past the temperature switch 20 to the lower surface 36 of the housing 32 and then possibly contacting electrical contacts in contact with the switch 20. Gasket 38 has been selected to have a sufficient degree of durability under exposure to heat to withstand temperatures it is likely to experience as would be understood of ordinary skill in the art, such at least about 375 degrees or even about or exceeding 500 degrees Farenheit.

As can be seen in FIG. 5, the upper surface 26 of the temperature switch 20 is preferably located within the drip bowl or pan cavity 40 and below an upper surface of coil 16 if not below the coil 16. Other embodiments may have switch 20 located at the upper surface 28 of the bore 22 or even below the bore 22 for some embodiments relative to the drip bowl or drip pan 24 or drip bowl cavity 40. Some embodiments align the switch 20 with an axis 23 of the bore 22 in the drip pan 24. Other embodiments may be able to locate the temperature switch 20 higher relative to the embodiment shown and/or closer to the coils 16 of the heating element 12. The switch 20 is preferably radiantly heated by the coils 16 for many embodiments, although at least some conductive heat could be transmitted with other embodiments.

The housing 32 is shown extending into the volume 44 of the burner box 42 which is the area between the burner box 42 and the upper surface 46 of the range 10. The housing 32 preferably provides a location onto which one or more of the temperature switches 20 may be mounted above a floor 43 of the burner box 42.

Through trial and error, the temperature rating of the temperature switches 20 for the respective eyes were selected by the applicant (four eyes, or burner elements 12,18 are shown in FIG. 1, and at least three are very common for many embodiments, with each somewhat similarly constructed with a respective switch 20 in the illustrated embodiment). Trials were used to arrive at desired temperature settings. Although the temperature setting of 500 degrees Fahrenheit worked satisfactorily for aluminum pans, the applicant discovered that a predetermined temperature of 375 degrees Fahrenheit setting was more desirable for the 8" element when using cast iron skillets due to the amount of heat that could be retained by a cast iron skillet to potentially cause an ignition in at least some situations even with electricity secured to the heating element. Other embodiments may use different temperature settings to open the switch 20 such as about 400, 425, 450, 475, 500 Farenheit or potentially anything up to 700 degrees up to and preferably below about 700 degrees Fahrenheit for the upper predetermined temperature limit. A similar lower temperature limit setting was utilized to restore the flow of electricity (i.e., close the switch 20) as the upper limit, but various embodiments need not necessarily have the same predetermined temperature for upper and lower settings.

Although the use of the temperature switch has been found to delay the time for water to boil on an open coil 16, it has not been found to completely prevent or prohibit such action as has the technology of U.S. Pat. No. 6,246,033 in which water will not boil in any test the applicant has conducted.

A wide range of temperature switches are available to the marketplace. A Therm-O-Disc™ brand switch was used particularly effectively by the applicant. These discs come with predetermined settings and the applicant selected about a 375 degree setting (upper and lower limit) for the preferred embodiment although other embodiments can certainly take other temperature settings depending on the placement of the temperature sensor relative to the coil 16 and its size and the relative size of the drip pan cavity 40 and/or other factors.

Figure 4:
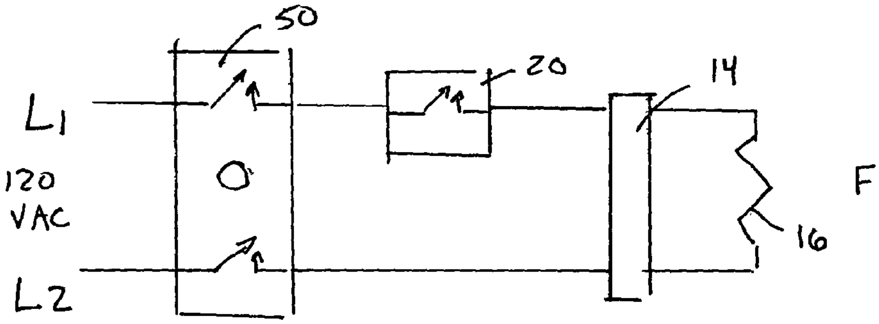
FIG. 4 is a circuit diagram showing a presently preferred embodiment of the present invention.

FIG. 4 provides a schematic of the operation showing 120 Volts provided to the top of the range 10 although 240 Volts could be provided in other embodiments. Electricity is directed through a heat controller 50 which can direct the flow of electrical energy to a particular coil 16 as would be understood by those of ordinary skill in the art, the difference being that the temperature switch 20 may either break the flow of electricity (i.e., open switch 20) or allow it (closed switch 20). As can be seen from the simple circuit, the temperature switch 20 is connected in connected series with the heating or burner element 12 for the preferred embodiment. Other embodiments may use a switch controller with a remote temperature sensor for more sophisticated embodiments.

Figure 6:
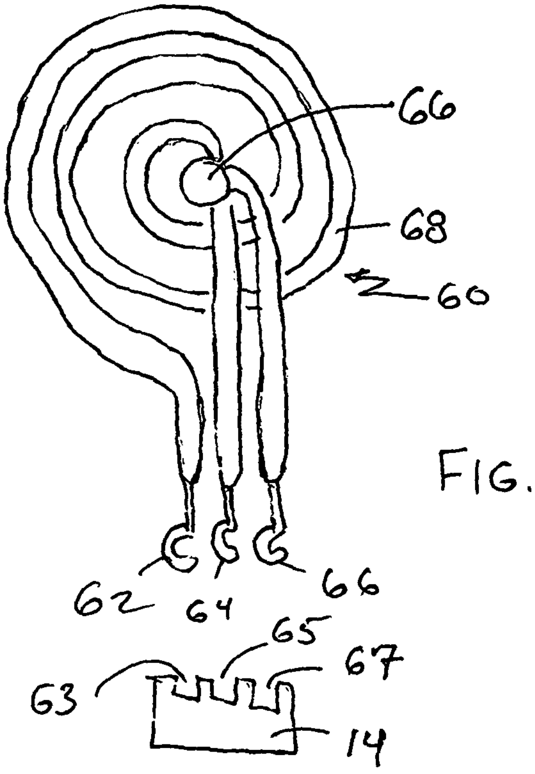
FIG. 6 is a top plan view of an alternatively preferred burner element.

FIG. 6 is an alternatively preferred embodiment of the invention with a heating element 60 which has power connection 62,64 for receiving power. A temperature sensor is shown as temperature switch 56 which is preferably in series with the passage of current from terminal 62 to terminal 64 (or visa versa). Alternatively, it may be provided that a separate electrical plug in connection 66 could be provided which directs at least a signal between the temperature switch of sensor 66 and a second connection 62,64 and then secures the flow of electricity through the terminals 62,64 (positive and negative, or even ground could be selected for first and second connections 62,64) through coils 68. By providing heating elements 60 in one of these configuration such as without optional connection 66, existing stoves, particularly those embodiments which do not rely upon a separate electrical connection 66 could be provided to the marketplace for existing open electric coil stoves without a need for providing new stoves to replace existing stoves. More sophisticated heating elements could be provided to the market. These alternatively preferred embodiments will be understood by those of ordinary skill in the art.

Figure 7:
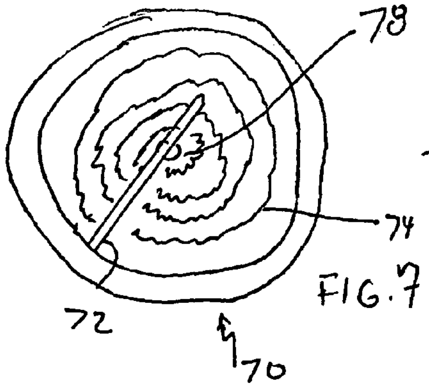
FIG. 7 is a top perspective view of second alternatively preferred embodiment in the form of a radiant element style burner.
Figure 8:
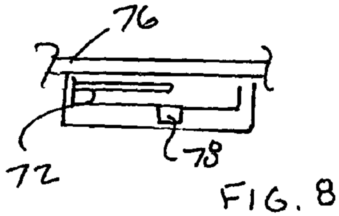
FIG. 8 is a cross sectional view of the embodiment of FIG. 7.

FIG. 7 shows a version of a well known embodiment of a radiant heating element 70. This embodiment could be provided with a temperature sensor 72 which may not only be utilized to provide a signal to a controller to secure the coils 74 to prevent the temperature at the glass section of a planar glass cooktop surface in FIG. 8 from reaching a predetermined value over 800 degrees to prevent a situation in which if water were splashed on the glass at such a high temperature, the glass 76 would shatter, but also to prevent items in a cooking article from exceeding an ignition temperature. The applicant is providing a temperature sensor 72 whether it be a separate temperature switch 78 where it would be provided or in series with the logic of the temperature sensor 72 and/or the logic of the temperature sensor 72 to secure the flow of current (i.e., open the switch 78) to prevent the temperature from exceeding 720 degrees and more preferably from exceeding about 700 degrees and more preferably from about 700 degrees and more preferably less than 700 degrees so that flammable materials do not ignite by those type ranges. Temperatures may need to be less than 700 in the burner 70, and may need to be significantly less than 700 Farenheit to prevent material in the cooking utensil from reaching an ignition temperature. Lower temperature settings to close switch 78 may be similar or dissimilar from upper temperature settings for opening switch 78 as described above for other embodiments.

As can be seen by various embodiments, electrical stoves can be made much safer although there is no electrical gadget can guarantee the prevention of fires in the absence of vigilance by the operator. Open electrical stoves should be watched at all times by those parties using them.

No party is known to provide a temperature switch in series with the burner coil for securing electrical power to the burner coil upon reaching a predetermined temperature:

No party is known by the applicant to provide a temperature switch and/or sensor at or below the coils such as in the drip pan cavity, at the drip pan bore, and/or proximate to the drip pan bore (or elsewhere) for use in securing power to a particular heating element upon exceeding a predetermined upper limit and then restoring power when dropping below a predetermined lower limit.

Furthermore, no party is known to provide a temperature switch and/or sensor which has an upper surface at or below the coil 16.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An electric range comprising:

a first exposed coil electric heating element at an upper surface of the range;

a temperature sensing switch connected within a drip pan cavity, said connection independent of the first exposed coil electric heating element to electric range in and electrical series with the first exposed coil electric heating element, wherein upon reaching a predetermined upper temperature, the switch opens thereby preventing the flow of electricity to the first exposed coil electric heating element and when the temperature is below a predetermined lower temperature, the switch closes permitting the flow of electricity.

2. The electric range of claim 1 wherein the temperature sensing switch is located below an upper surface of the first exposed coil electric heating element, said temperature sensing switch being heated apart from conducted heat.

3. The electric range of claim 2 wherein the temperature sensing switch is spaced by an air space from the first exposed coil electric heating element, said coil replaceably connected to the range independently from the temperature sensing switch.

4. The electric range of claim 3 wherein the temperature sensing switch is located in a drip pan cavity formed by at least a portion of the drip pan and the first exposed coil electric heating element spaced from and not controlling the heating element.

5. The electric range of claim 3 wherein range has a drip pan located below at least a portion of the first exposed coil electric heating element, and the temperature sensing switch is located along an axis extending through a bore in the drip pan.

6. The electric range of claim 1 wherein the first exposed coil electric heating element is supported by a housing above a floor of a burner box with the burner box defined between the floor and the upper surface of the range.

7. The electric range of claim 1 wherein the temperature switch is radiantly heated by the first exposed coil electric heating element.

8. The electric range of claim 1 wherein the first exposed coil heating element is one of at least three similar heating elements with respective temperature sensing switches, each in electrical series with the heating elements, respectively.

9. The electric range of claim 1 wherein the predetermined upper temperature is less than about 700 degrees Farenheit.

10. The electric range of claim 9 wherein the predetermined upper temperature is less than about 575 degrees Farenheit.

11. The electric range of claim 10 wherein the predetermined upper temperature is about 375 degrees Farenheit.

12. The electric range of claim 11 wherein the predetermined lower temperature is about 375 degrees Farenheit.

13. An electric exposed coil heating element in combination with a range, said combination comprising:

a resistance heating electric coil which provides heat to a cooking utensil upon receipt of electricity from a first to a second plug-in connection;

a temperature switch physically connected to the coil and electrically connected in series with the coil whereby when the temperature switch reaches a predetermined upper temperature, the switch opens thereby preventing the flow of electricity between the positive and negative connections within the coil, and when the temperature drops below a predetermined lower temperature, the switch closes thereby permitting the flow of electricity through the first and second plug in connections;

a socket which receives the first and second plug in connections;

wherein the socket has first second and third socket connections, with the first and second socket connections receiving the first and second connections of the plug in connections of the coil and the third socket connection electrically connected to the temperature switch, and upon reaching the predetermined value, the opening of the switch secures electricity flow through the third connection which simultaneously prevents electricity flow through at least one of the first and second plug in connections.

14. An electric range comprising:

a planar glass cooktop surface extending over multiple burners;

a first burner of the multiple burners located completely below the glass cooktop surface with coils, said burner having a temperature sensor connected to the first burner below the planar glass cooktop surface, and wherein when a sensed temperature between the coils and the glass exceeds a predetermined upper temperature of no more than about 725 degrees, a switch in electrical communication with the first burner secures electricity to the first burner until the sensed temperature drops below a predetermined lower temperature.

15. The electric range of claim 14 wherein the predetermined upper temperature is no more than about 575 degrees.

16. The electric range of claim 15 wherein the predetermined lower temperature is about 575 degrees.

17. The electric range of claim 14 wherein the predetermined lower temperature is less than about 725 degrees.

* * * * *